United States Patent [19]
Gord

[11] Patent Number: 6,101,504
[45] Date of Patent: Aug. 8, 2000

[54] METHOD FOR REDUCING SEMAPHORE CONTENTION DURING A WAIT TO TRANSFER LOG BUFFERS TO PERSISTENT STORAGE WHEN PERFORMING ASYNCHRONOUS WRITES TO DATABASE LOGS USING MULTIPLE INSERTION POINTS

[75] Inventor: William Eugene Gord, The Dalles, Oreg.

[73] Assignee: Unisys Corp., Blue Bell, Pa.

[21] Appl. No.: 09/151,656

[22] Filed: Apr. 24, 1998

[51] Int. Cl.⁷ ...................................................... G06F 17/30
[52] U.S. Cl. .......................... 707/201; 707/202; 705/400; 711/100
[58] Field of Search ..................... 707/201, 202; 705/400; 711/100

[56] References Cited

U.S. PATENT DOCUMENTS

| | | | |
|---|---|---|---|
| 4,507,751 | 3/1985 | Gawlick et al. | 364/900 |
| 5,201,044 | 4/1993 | Frey, Jr. et al. | 395/75 |
| 5,465,328 | 11/1995 | Dievendorff et al. | 395/182.13 |
| 5,754,888 | 5/1998 | Yang et al. | 395/872 |
| 5,832,484 | 11/1998 | Sankaran et al. | 707/8 |

*Primary Examiner*—John E. Breene
*Assistant Examiner*—Cheryl Lewis
*Attorney, Agent, or Firm*—J. Ronald Richebourg; Mark T. Starr; Steven B. Samuels

[57] ABSTRACT

A method in a symmetric multi-processor computer system for increasing database transaction log performance by reducing semaphore contention while waiting to transfer the contents of log buffers stored in a volatile memory of the system to a persistent storage device. The method includes the steps of clearing a switch and resetting an event indicating that no process tasks are waiting completion of a transfer of information in one of the log buffers to the persistent storage. Next, an atomic test-and-set of the switch is performed to determine if this process task is the first task to attempt the waiting completion. Following this, if it is the first task, then it assumes responsibility for guaranteeing that the contents in the log buffer are in persistent storage and causes the event. However, if it is not the first task, a wait is imposed on the process until the event has been caused. This will allow all of the "Not First" tasks that may be waiting to continue their operation.

5 Claims, 12 Drawing Sheets

METHOD FOR REDUCING SEMAPHORE CONTENTION DURING A WAIT TO TRANSFER LOG BUFFERS TO PERSISTENT STORAGE WHEN PERFORMING ASYNCHRONOUS WRITES TO DATABASE LOGS USING MULTIPLE INSERTION POINTS

CROSS REFERENCE TO RELATED PATENT APPLICATIONS

This application relates to the following co-pending application, assigned to the same assignee hereof, which are incorporated herein by reference.

U.S. Ser. No. 09/,066,144,entitled, A METHOD FOR INCREASING DATABASE TRANSACTION LOG PERFORMANCE ON SYMMETRIC MULTI-PROCESSOR (SMP) COMPUTER SYSTEMS BY PIPELINING TRANSACTION LOG BUFFERS by the same inventor hereof, pending.

FIELD OF THE INVENTION

The present invention generally relates to databases for Symmetric Multi Processor (SMP) computer systems and in particular to a computer implemented method for improving the throughput of the transaction log in such databases by reducing lock contention.

BACKGROUND OF THE INVENTION

Terminology and some general concepts used herein can be found in "Transaction Processing: Concepts and Technology" by Jim Gray and Andreas Reuter; Morgan Kaufmann Publishers, San Francisco, Calif.; 1993.

In prior art implementations of Database Management Systems (e.g., the DMSII product of the assignee hereof), it was observed that the process of managing the transaction log was a major system throughput bottleneck in SMP computer systems with a large number of processors. This was true for a number of reasons. These issues and their solutions are addressed in the following paragraphs.

1. Semaphore Contention

In prior art implementations there was a single Exclusive Semaphore (herein called the Log Lock) which is used to control all of the processes for managing the database transaction log, including: serializing the insertion of log records into the log buffers, check-summing the log buffers, initiation and termination of the disk write operations to the log file, and opening and closing the transaction log files.

On an SMP computer system, at most one processor's worth of work can be accomplished by any collection of tasks which are contending for the resources controlled by a single exclusive semaphore. This is the saturation effect.

Additionally, there is a high processor overhead cost in managing the FIFO contention for this exclusive semaphore in a manner that avoids the convoy phenomenon (which is known to be even more undesirable). This is an exponentially increasing cost as the semaphore approaches saturation.

Reduction in semaphore contention when generating log images is one step that results in increased throughput to the database transaction log.

The logging process is made up of a number of discrete steps. While the final results of these steps must give the appearance of being performed serially, some of the steps may be performed in parallel or even out of order. Four distinct steps are identified, allowing the use of three exclusive semaphores which increases the semaphore granularity of the log algorithm.

These four steps allow the log algorithm to be implemented as a pipeline, greatly increasing the overall throughput of transaction logging. The steps are: (1) Insertion of log records into the transaction log and insertion of log buffers in to the log buffer queue; these operations are protected by the Log Lock. (2) The process that dequeues log buffers for writing to disk, which is guarded by the Log Queue Lock. (3) The process of calculating the checksum value and initiating the asynchronous disk write operation for the log buffer, which needs no mutual exclusion semaphore. (4) The process of waiting for the completion of log buffer disk writes such that the log constraint guarantee can be maintained in a serial fashion; this is protected by the Log IOC Lock.

2. Log Buffer Limitations

The prior art DMSII product utilized two transaction log buffers so that one (the "TOP" buffer) is being filled by the transaction log record images that are being generated by the operation of the database management system, while the second buffer (the "BOTTOM" buffer) is performing asynchronous physical disk write operations to the transaction log file. When the TOP buffer becomes full and the BOTTOM buffer has been written to disk, the two buffers are swapped, and the insertion of log records continues in the new, empty TOP buffer. The use of only two buffers assumes that the write operation of the BOTTOM buffer can always complete before the TOP buffer is filled.

Increases in physical I/O performance have been outpaced by increases in processor speed, the number of processors available on SMP computer systems, and the number of application programs that are now being run on large SMP systems. Consequently, the BOTTOM buffer will seldom be ready for use by the time that the TOP buffer is filled. Logging activity (and therefore transaction processing) can be halted while waiting for log disk write operations to complete.

Two techniques are employed to prevent the rapid filling of the TOP buffer from halting transaction logging activity.

The maximum buffer size is allowed to increase dynamically; the final size may exceed the log buffer specification as declared in the database description.

Using larger log buffers increases the efficiency of the disk write operation. Each disk write operation incurs some fixed amount of processor overhead for initiation and termination of the write operation, plus the I/O costs directly related to the amount of data being written.

Since the total amount of log data to be written is inflexible, decreasing the number of disk write operations requires an increase in the amount of data transferred in each write operation. This is accomplished by increasing the size of the log buffers.

In addition, the number of buffers is increased in conjunction with the implementation of the pipelined transaction log algorithm mentioned above. Increasing the number of log buffers allows the system to queue log write activity during those peak periods when log buffers can be filled faster than they can be written to disk. This technique extends the amount of time that the system can sustain those peak periods before disk write activity begins to negatively impact transaction processing performance. The number of buffers required is a function of the amount of transaction log record data generated during peak processing periods, the size of the log buffers, and the disk write bandwidth of the log file.

3. End of Transaction (ETR) Commit Issues

End of Transaction commit guarantees that all data modifications made by the transaction are recoverable once the task has received the "transaction completed" response from the DBMS. This is accomplished by forcing the TOP buffer to be written to disk as soon as an ETR log record is inserted into it, even though there may be space in the TOP buffer for additional log records. This naive solution usually requires log disk writes to occur more frequently than would be otherwise necessary, especially with large number of application tasks. This imposes a severe throughput performance penalty on the transaction log process.

Prior art Database Management Systems leave the TOP buffer as the TOP buffer until such time as it is actually possible to write that buffer to the log file. After inserting the ETR record into the TOP buffer, the log algorithm waits (with the Log Lock free) until the BOTTOM buffer (the only other log buffer in prior art Database Management Systems) is I/O complete. At that point the TOP buffer can be written. During this wait, the log algorithm allows other tasks to add their log records to the TOP log buffer. The intent is that during this time interval, other tasks can put more log records, including additional ETR records, into the TOP buffer. This is known as the ETR boxcar effect and maximizes the size of the TOP buffer while minimizes the number of buffers that are written to the log disk file.

4. Disk Write Complete Waiting

Unfortunately, the ETR boxcar effect introduces a serious semaphore contention problem. A large number of tasks (one for each ETR record in the TOP buffer) will all contend for the privilege of queuing and writing that TOP buffer to the log file, all at once, and immediately when the previous log buffer disk write operation completes. All these tasks are contending for the privilege of being the one to actually queue the TOP log buffer and get the next disk write operation started. Of course, only the first task will need to perform the actual work, whereas the other tasks will only find, in a serial fashion, that the buffer with their ETR record is no longer the TOP buffer and is already written.

The solution is to separate the first write waiter task from all subsequent waiter tasks (on the same buffer). This first waiter assumes the responsibility for the complete process of (1) waiting for the previous buffer to be complete, (2) queuing the TOP buffer, (3) starting the disk write on that queued buffer, and (4) waiting for the disk write operation to complete. At that point an event associated with the log buffer is caused that will wake up all the other ETR tasks for the write completion of that buffer. Note that as all the other ETR-waiting tasks wake up, they can immediately continue with their processing without serially contending for the identical semaphore.

While the foregoing describes the separation of first and later waiters in an ETR commit context, the process is actually generalized for all tasks that have the need to wait for the write completion of a particular log buffer.

5. Log Bandwidth to Disk

The throughput improvements described above streamlining the transaction log generation process within an SMP processor, allow more processor cycles to be available for other, non log related, processing. However, overall throughput to the transaction log is still limited by the speed at which that amount of log data that can be written to disk system.

This problem of disk write I/O bandpass is addressed with the introduction of Section Log Files. A logical transaction log file can be composed of 1 or more physical disk files (each called a log section file). The number of log section files to use is determined manually, based upon SMP computer system configuration and application workload characteristics. Assuming that each Log Section File is allocated on a separate physical disk media, the maximum write bandpass to the logical transaction file will be the sum of the bandpasses of the individual physical disk media. Log buffers are sequentially distributed, in a round-robin fashion, among the log sections.

The log algorithm can initiate asynchronous write operations to each of the log section files, thus for S log section files, S simultaneous log disk write operations can be initiated. It is only necessary to wait for the previous log buffer write to the same log section before starting a log disk write; since additional log buffers will have been written to other log sections between the two log buffers that physically reside in the same section, there is an increased possibility that no actual waiting will need to occur prior to initiating the disk write operation for a log buffer.

It is necessary to guarantee that log buffer disk write operations appear to complete in a serial fashion, independent of the parallelism occurring during the disk writes.

SUMMARY OF THE INVENTION

The solutions provided by the methods of the present invention are to improve the throughput of Database Management Systems during the process of generating transaction log files.

Accordingly, it is an object of the present invention to provide a computer implemented method for minimizing the processor cost of lock management and contention at the end of writing a log block to disk.

Still other objects of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

DETAILED DESCRIPTION OF ONE EMBODIMENT

Figure 1:
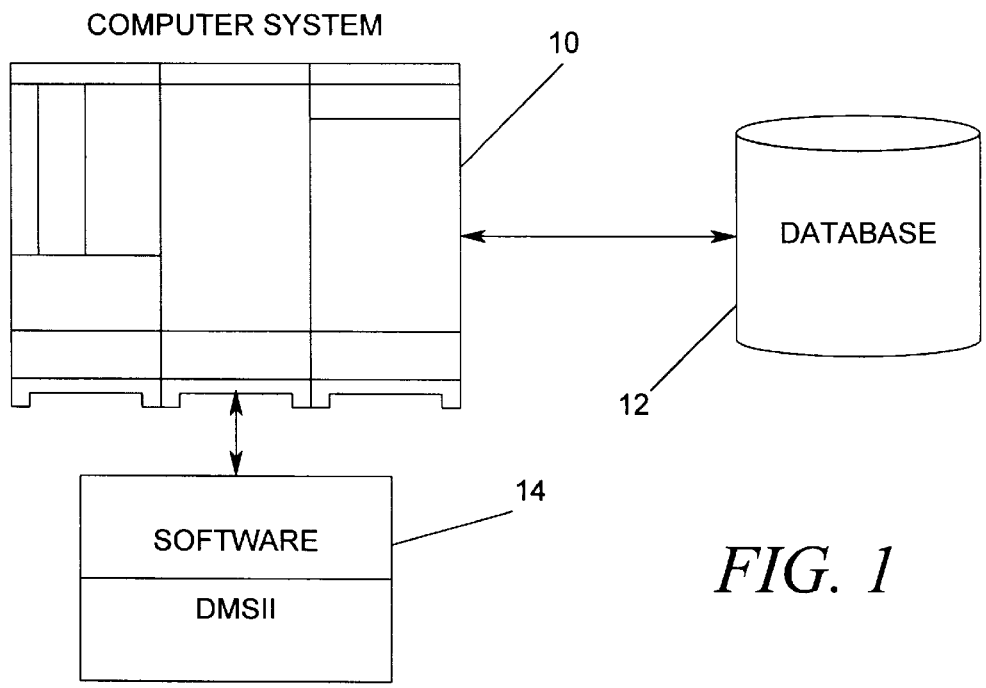
FIG. 1 is a general block diagram of a computer system that may employ the method of the present invention.

Referring now to the drawings and to FIG. 1 in particular, a general block diagram of a computer system that may employ the method of the present invention is shown. A computer system 10 has coupled thereto a database 12 for storage and organization of data. The computer system 10 executes a variety of software to perform a variety of tasks and one such software program is a Database Management System II product available from the assignee hereof.

Figure 2:
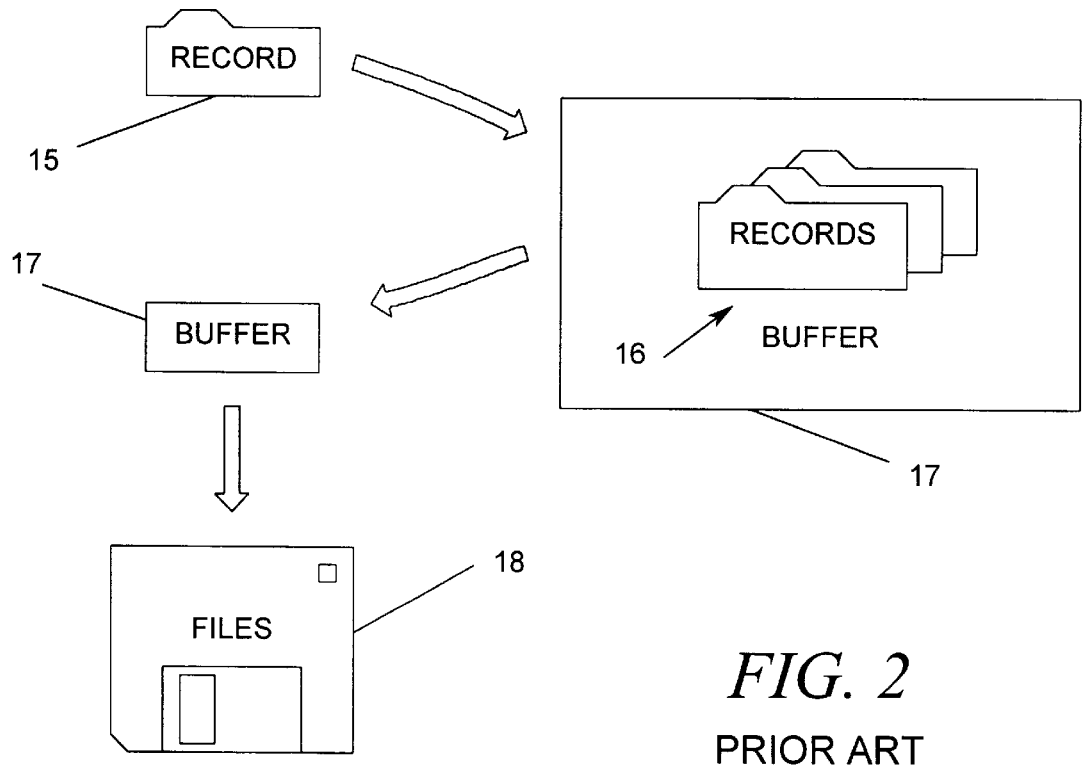
FIG. 2 is block diagram of the prior art components for a log algorithm.

Referring to FIG. 2, a block diagram illustrates the components of a prior art log algorithm. A record 15 is organized with other records 16 into a buffer 17 of records. The buffer 17 is then organized into files 18, which are stored in the database 12.

Figure 3:
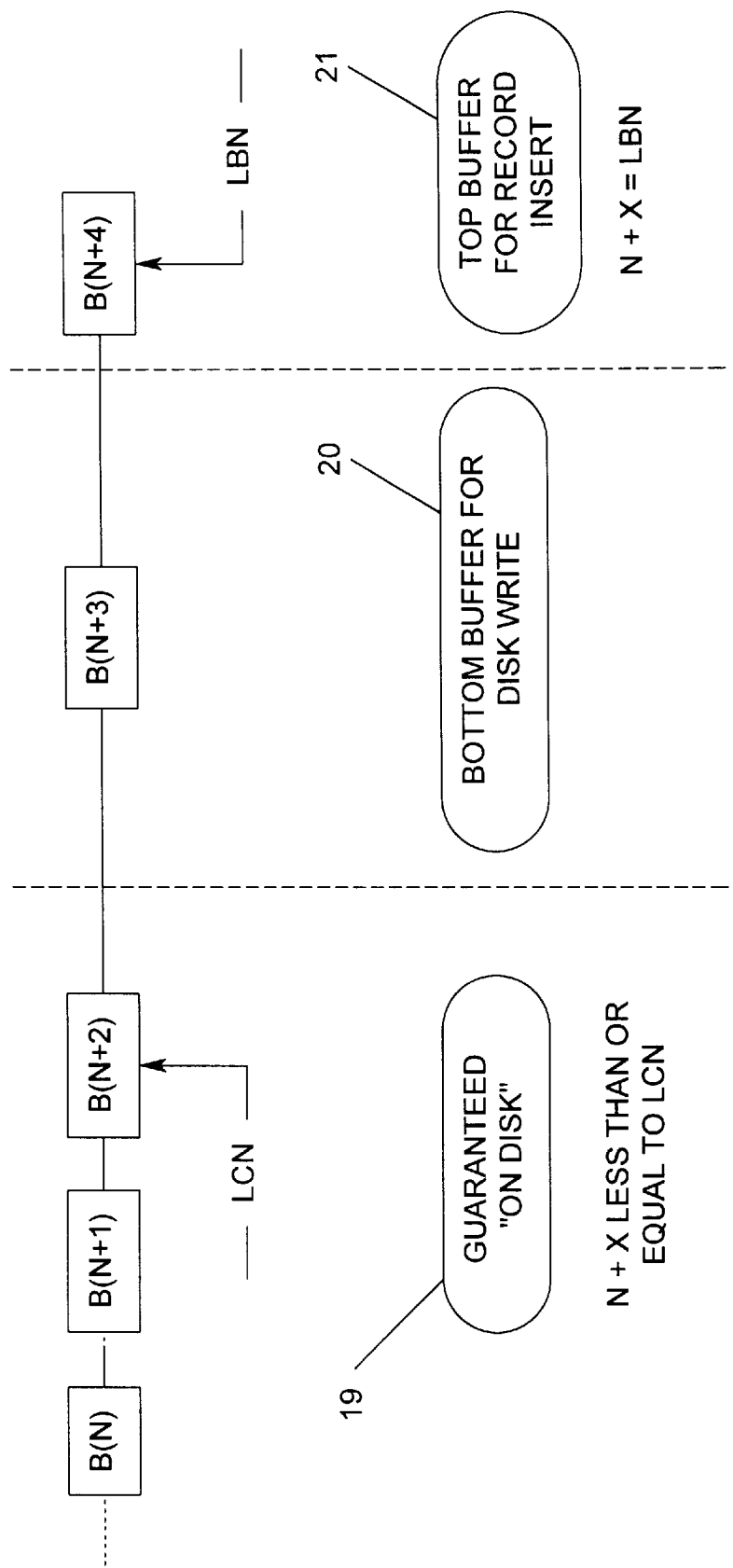
FIG. 3 is a data flow diagram showing transaction log buffers before, during and after a write to disk operation using the prior art method.

Referring to FIG. 3 a data flow diagram illustrates transaction log buffers before, during and after a write to disk operation using the prior art method described hereinbelow with reference to FIGS. 4A through 4C. Empty log buffers appear on the right-hand side of the drawing when viewed in a conventional manner. The buffers are sequentially filled with log records, and progress leftward through the steps of the logging algorithm until they are stored on disk. For example, buffers B(N), B(N+1) and B(N+2) were the first buffers to be written to disk and as noted by bubble 19 are guaranteed to be on disk. A Log Constraint Number or LCN is entered for buffer B(N+2) to record the fact that it was the most recent buffer known to be written to disk. It is pointed out that value of N+X for all log buffers that are guaranteed to be on disk is less than or equal to the value of the Log Constraint Number. Buffer B(N+3) is in the BOTTOM buffer waiting to be written to disk (bubble 20) while buffer B(N+4) is in the TOP buffer for Log Record insertion (bubble 21). Note that a monotonically increasing Log Buffer Number or LBN is entered for the buffer B(N+4) and for each new buffer as it becomes the TOP buffer. Also note that N+X is equal to the value in the Log Buffer Number. As discussed hereinabove under BACKGROUND OF THE INVENTION, the prior art method creates a bottleneck in that the buffers are written to disk in a serial fashion.

Figure 4A:
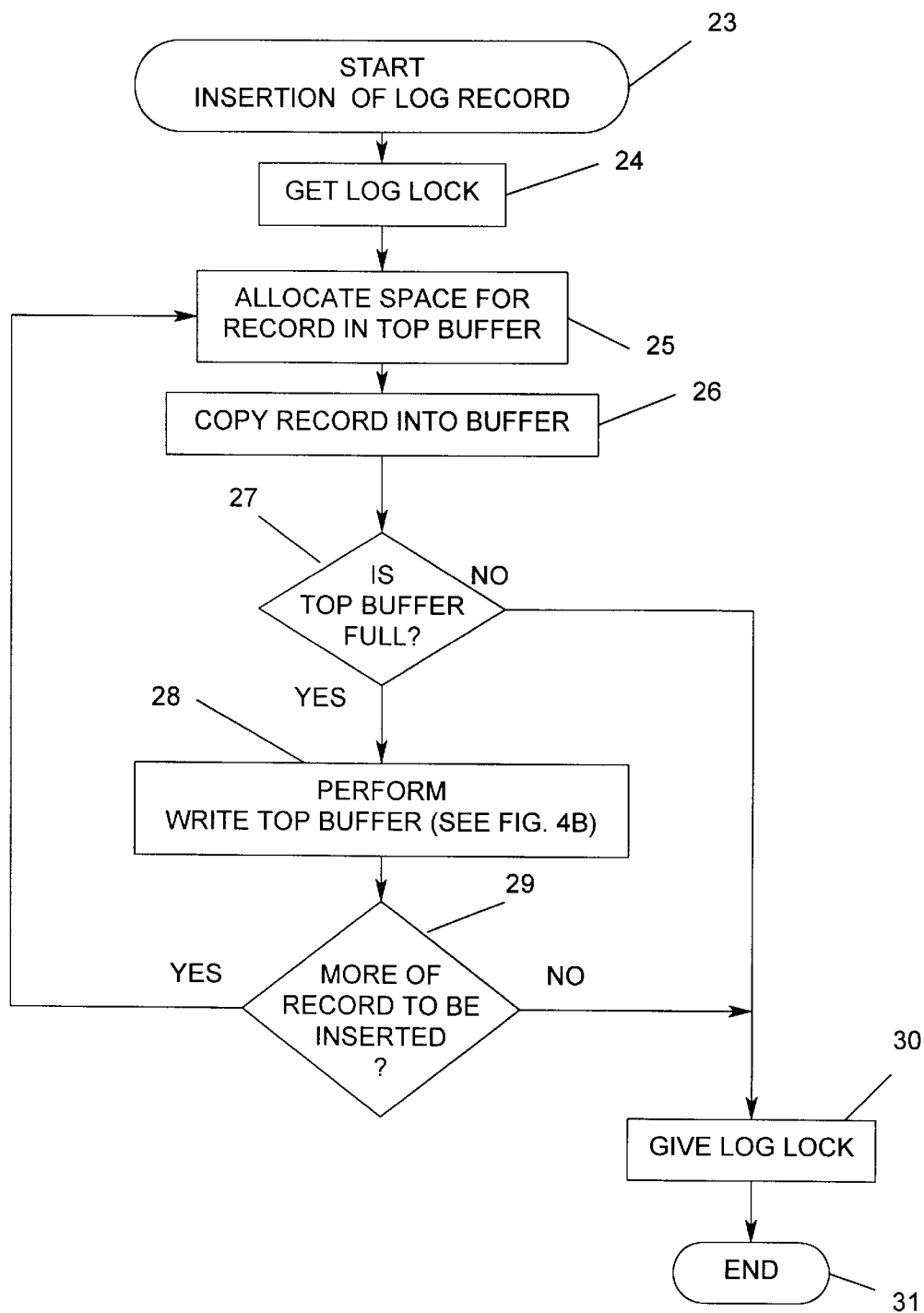
FIGS. 4A through 4C are flow charts of the prior art method for a log algorithm.

Referring now to FIG. 4A, a flow chart illustrates the steps of a process for performing the prior art log algorithm. The process begins with a start bubble 23 for insertion of a Log Record, followed by a step of getting the Log Lock (block 24). Log Lock guards all activity and state of logging, including the pointer to the TOP buffer. Next, space is allocated in the TOP log buffer to hold the Log Record (block 25). Following this, the Log Record is copied into the TOP buffer (block 26). A test is next made as to whether or not the TOP buffer is full (diamond 27). If the answer to this test is yes, then a write TOP buffer operation is performed (block 28). This step is amplified in FIG. 4B and will be explained further hereafter. Another test is made as to whether or not more of the Log Record is to be inserted (diamond 29). If the answer to this test is yes, then a return is made back to the block 25 to allocated additional space for the Record in the next TOP buffer.

If the answer to the tests in the diamonds 27 or 29 is no, then Log Lock is released (block 30) and the process is ended (bubble 31).

Figure 4B:
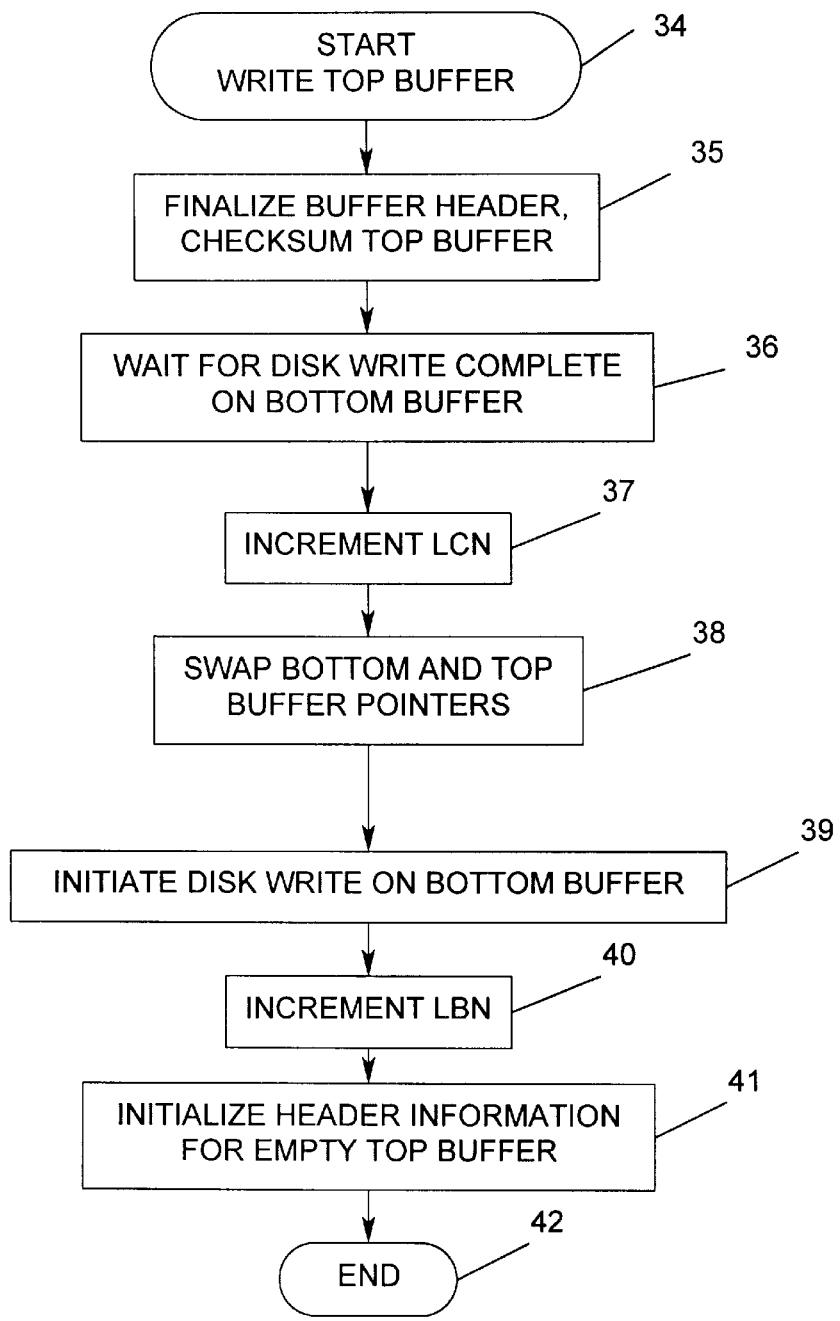

Referring now to FIG. 4B, the write TOP buffer operation is illustrated with a start bubble 34. Next, a finalize block header operation is performed, which determines the length of the buffer and calculates and assigns a checksum to the TOP buffer (block 35). Following this, a wait is imposed for the disk write to complete the BOTTOM buffer (block 36).

Next, the Log Constraint Number is incremented (block 37) and the BOTTOM and TOP buffers are swapped (block 38) because the BOTTOM buffer (in memory) is effectively empty, whereas the TOP buffer needs to be written. Following this, a disk write operation is initiated on the BOTTOM buffer (block 39). The Log Buffer Number is incremented by one for the new, empty, TOP buffer (block 40), the header information is initialized (block 41) and the process ends (bubble 42).

Figure 4C:
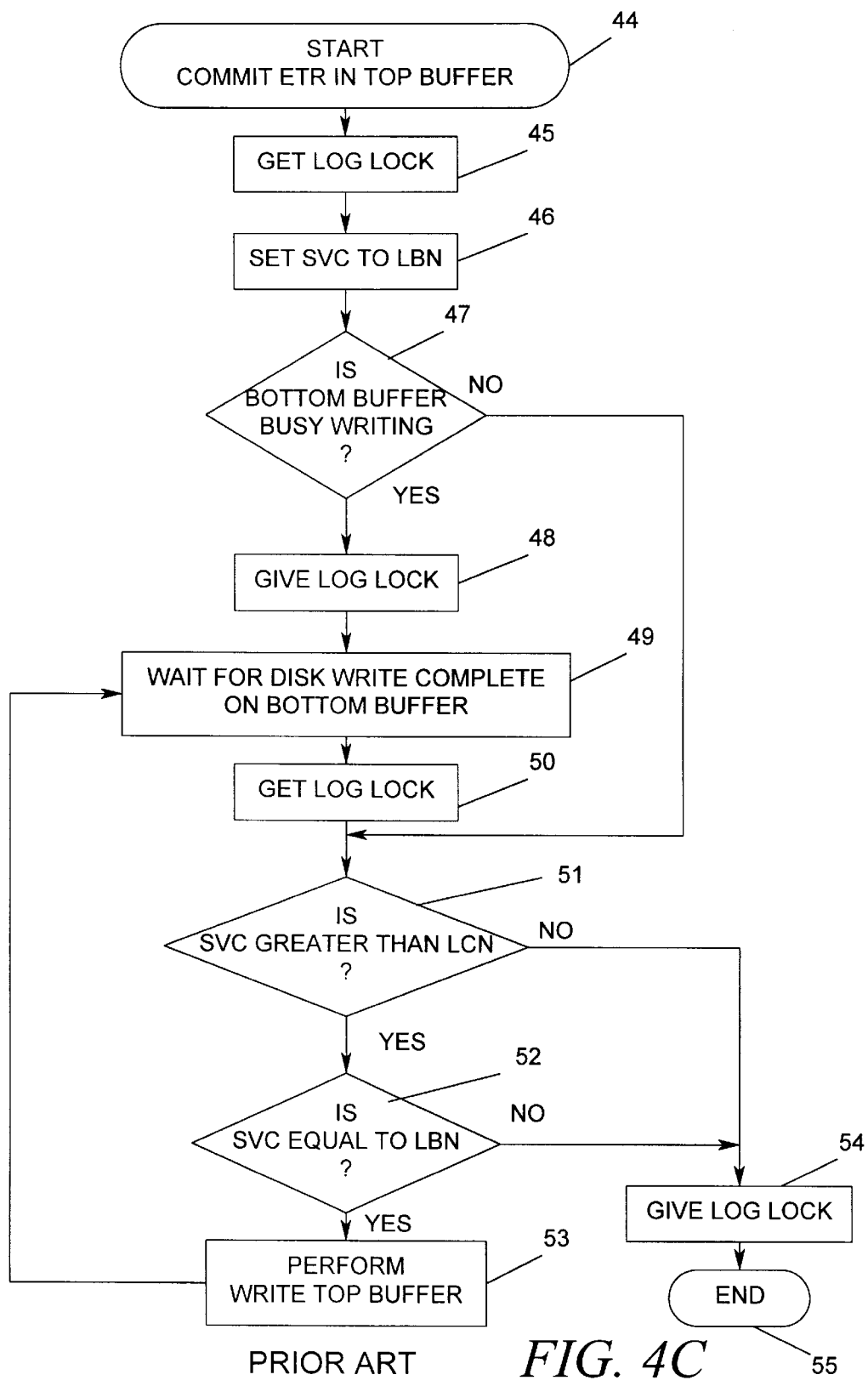

Referring now to FIG. 4C, a flow chart illustrates the Commit End of Transaction Record in the TOP buffer operation. The process begins with a start bubble 44 followed by a step of getting the Log Lock (block 45). Next, the Save Counter or SVC is set to the Log Buffer Number (block 46) followed by a test as to whether or not the BOTTOM buffer is busy writing (diamond 47). If the answer to this test is no, then the Log Lock is released (block 48). Next, the operation waits for the disk write operation to complete writing the BOTTOM buffer contents (block 49) and the Log Lock is obtained (block 50). Since Log Lock is not held at Block 49, this provides a time interval for other tasks to add additional Log Records to the TOP buffer.

A test is made as to whether or not the SVC is greater than the Log Constraint Number or LCN (diamond 51), which indicates that the buffer has been written onto disk. If the answer to this test is yes, then another test is made as to whether or not the SVC is equal to the Log Buffer Number or LBN (diamond 52). This indicates whether or not the TOP buffer is the same one as at the start. If the answer to this test is yes, then a write the TOP buffer operation is performed (block 53) and a return is made back to the block 49 for the wait operation.

If the answer to either of the tests in the diamonds 51 or 52 is no, the Log Lock is released (block 54) and the process ends (bubble 55).

Figure 5:
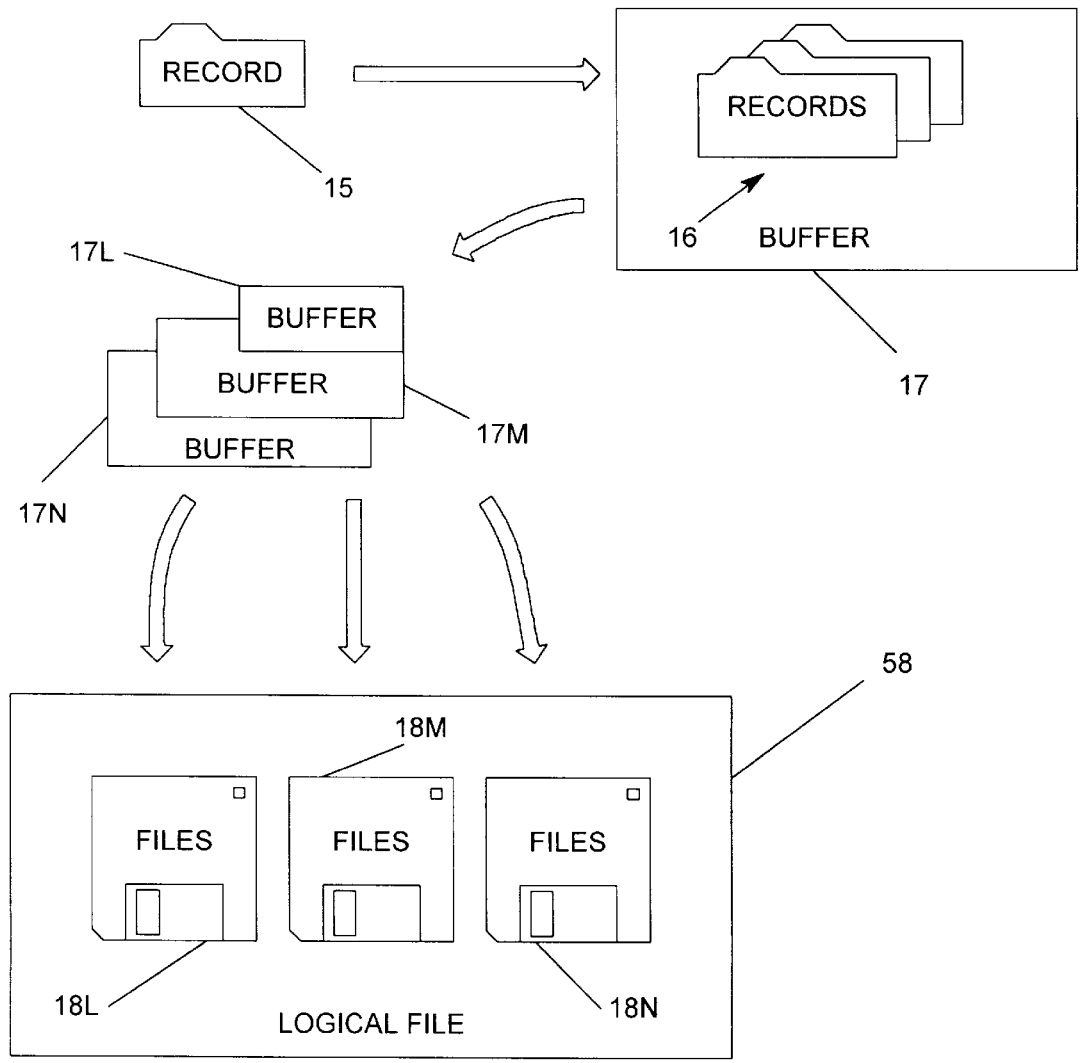
FIG. 5 is a block diagram of the components for a log algorithm employing the method of the present invention.

FIG. 5 is a block diagram illustrating the components of a log algorithm employing the method of the present invention, wherein like reference numerals are used for like elements shown in FIG. 2. The major difference in the new algorithm is the ability to parallel write buffers 17L, 17M, 17N, . . . into files 18L, 18M, 18N, . . . , respectively, thereby forming a logical file 58.

Figure 6:
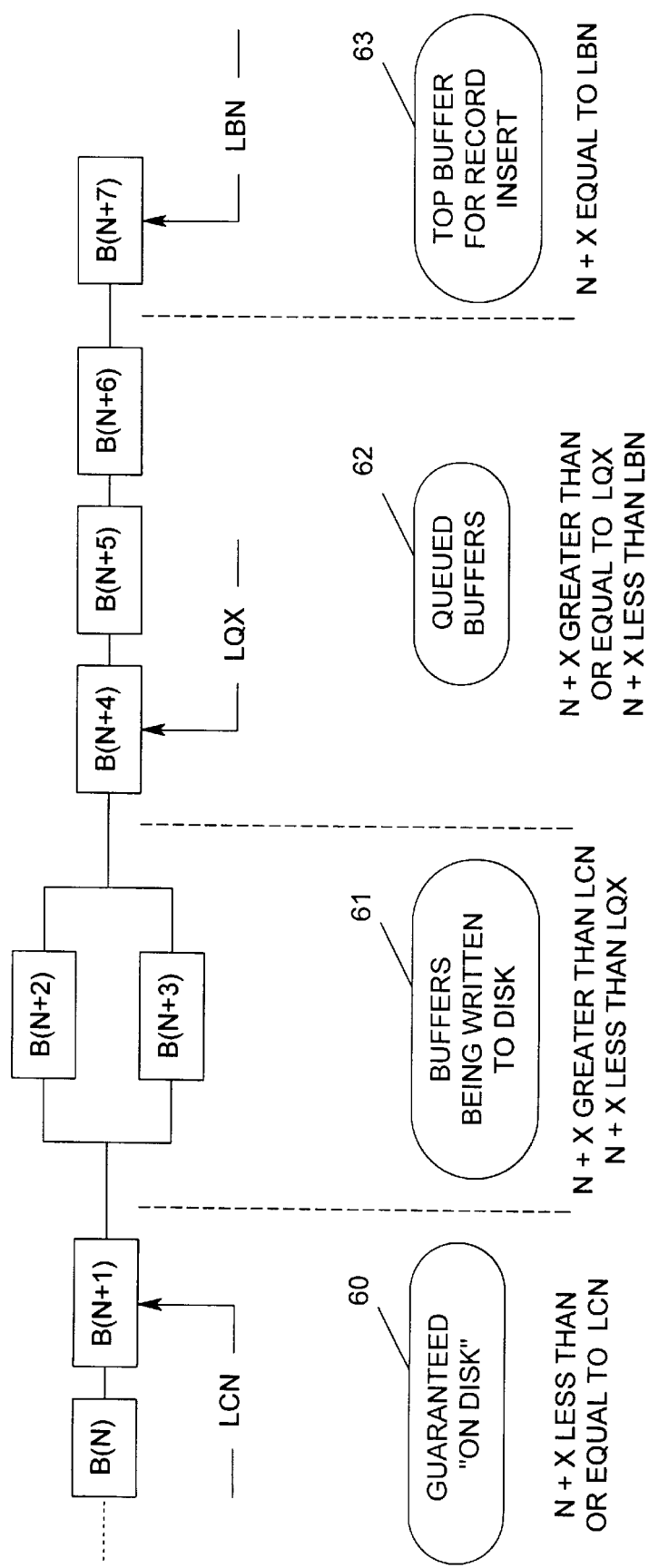
FIG. 6 is a data flow diagram showing transaction log buffers before, during and after a write to disk operation as the components flow through the pipeline of the log algorithm, using the method of the resent invention.

Referring now to FIG. 6, a data flow diagram shows transaction log buffers before, during and after a write to disk operation as they flow through the pipeline of the log algorithm. Again, as described above with reference to FIG. 3, empty log buffers are added on the right-hand side of the drawing when viewed in the conventional manner. The buffers are sequentially filled with log records as before, and progress leftward through the steps of the log algorithm until they are stored on disk. Buffers B(N) and B(N+1) were the first buffers and as illustrated are guaranteed to be on disk (bubble 60). The Log Constraint Number or LCN is entered for the buffer B(N+1), wherein N+X is less than or equal to the Log Constraint Number. Buffers B(N+2) and B(N+3) are being written to disk as denoted by bubble 61 and N+X is greater than LCN but less than the Log Queue Index or LQX.

Buffers B(N+4), B(N+5) and B(N+6) are concurrenlty queued for writing to disk as denoted by bubble 62. Note that the Log Queue Index or LQX number is entered for buffer B(N+4), wherein N+X is greater than or equal to LQX and less than the value of the Log Buffer Number or LBN. Buffer B(N+7) is the TOP buffer awaiting Log Record insertion as denoted by bubble 63. Note that the Log Buffer Number or LBN value is entered for the buffer B(N+7) and N+X is equal to the value in the LBN.

Figure 7A:
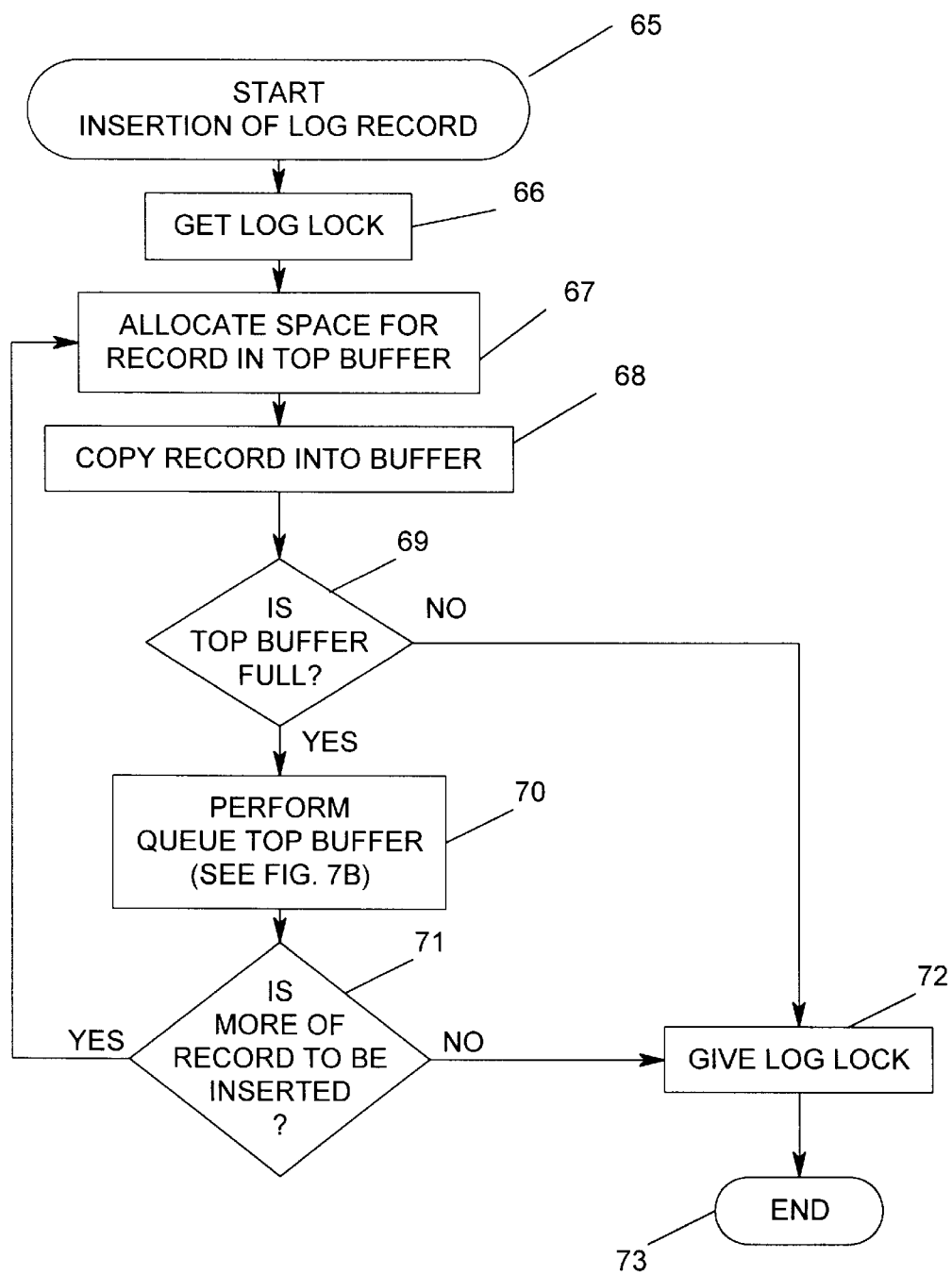
FIGS. 7A through 7E is a combined flow chart of the log algorithm employing the method of the present invention.

Referring now to FIG. 7A, a flow chart illustrates the process details for the log algorithm of the present invention. The process begins the insertion of a Log Record at a start bubble 65, followed by a step of getting Log Lock (block 66). Next, space is allocated in the TOP buffer for holding the Log Record (block 67). After this, the Record is put into the TOP buffer (block 68). An inquiry is next made as to whether or not the buffer is full (diamond 69). If the answer to this inquiry is yes, then the buffer is put into the write queue and space is allocated for a new TOP buffer (block 70), which is amplified in FIG. 7B. On the other hand, if the answer to the inquiry in the diamond 69 is no, then the steps 70 and 71 are bypassed.

Another inquiry is made as to whether or not more of the Log Record to be inserted (diamond 71). If the answer to this inquiry is yes, then a return is made back to the step depicted by the block 67 for processing the additional portions of the Record. On the other hand, if the answer to the inquiry in the diamond 71 is no, or if the answer to the inquiry in the diamond 69 is no, then the Log Lock is released (block 72) and the process ends (bubble 73).

Figure 7B:
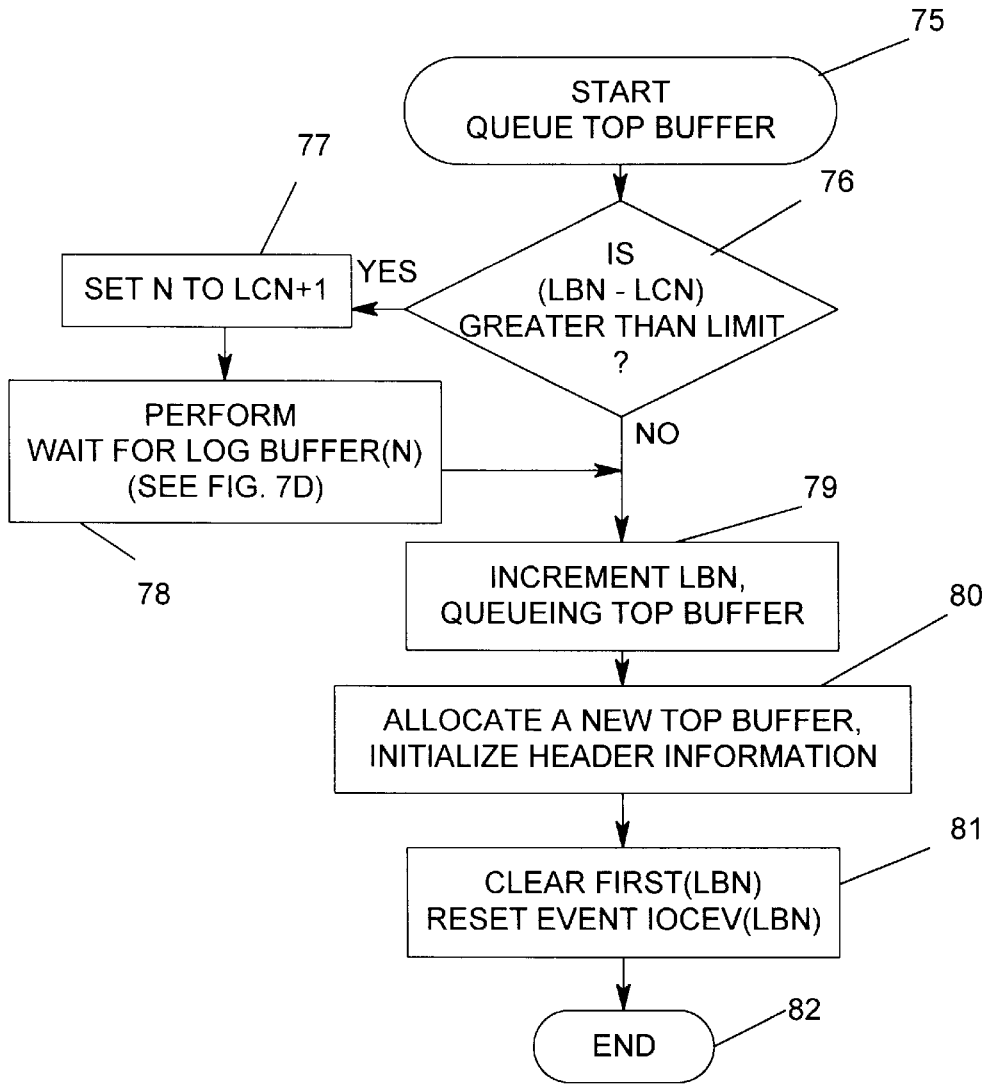

Referring now to FIG. 7B a process for queuing the TOP buffer is shown, wherein the process begins with a start bubble 75. Next, an inquiry is made as to whether or not the current Log Buffer Number value minus the Log Constraint Number is greater than a given LIMIT (diamond 76). The value of the LIMIT is determined by the maximum number of buffers that can exist in memory before being forced to be written to disk. If the answer to this inquiry is yes, then the value for N is set to the Log Constraint Number plus one (block 77). Next, a wait for Log buffer B(N) operation is performed (block 78), which is amplified in FIG. 7D. Once this step is complete, or if the answer to the inquiry in the diamond 76 is no, then the Log Buffer Number is incremented for queuing the TOP buffer (block 79). Following this, a new TOP buffer is allocated and header information is initialized (block 80). Next, the First Switch for Buffer LBN is cleared and the I/O Complete Event (IOCEV) for buffer LBN is reset (block 81) and the process ends (bubble 82).

Figure 7C:
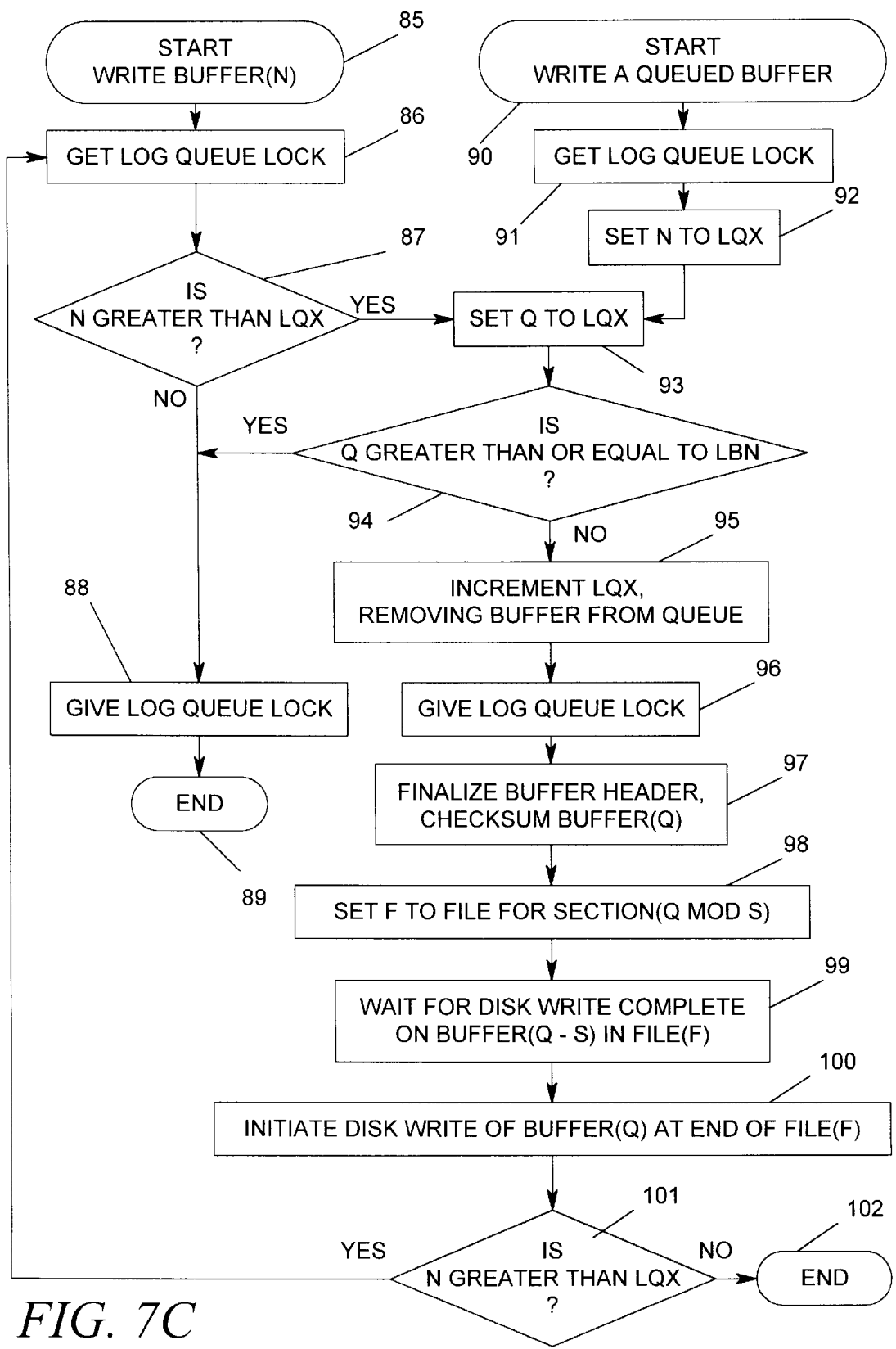

Referring now to FIG. 7C, the Write Buffer N and Write A Queued Buffer operations are illustrated. The Write Buffer N operation will initiate the asynchronous disk write operation on Buffer N and all earlier buffers that are still queued. The operation begins with a start bubble 85 followed by a step of getting Log Queue Lock (block 86). Next, an inquiry is made as to whether or not N is greater than the Log Queue Index or LQX value (diamond 87). If the answer to this inquiry is no, then Log Queue Lock is released (block 88) and the process ends (bubble 89).

The Write A Queued Buffer operation will initiate the asynchronous disk write operation on the log buffer indicated by LQX. The Write A Queued Buffer operation begins with a start bubble 90 followed by a step of getting the Log Queue Lock (block 91). Next, N is set to the value of LQX (block 92) and Q is also set to the value of LQX (block 93). It is noted that if N is greater than LQX, i.e., yes answer to the inquiry in the diamond 87, then Q is set to the value of LQX (block 93). Q now indicates the particular buffer to be written. Following this, another inquiry is made as to whether or not Q is greater than or equal to the value in the Log Buffer Number (LBN) (diamond 94). If the answer to this inquiry is yes, then no more buffers are queued, so Log Queue Lock is released (block 88).

On the other hand, if Q is not greater than LBN, i.e., the answer to the inquiry in the diamond 94 is no, then LQX is incremented thereby removing the buffer from the queue (block 95). Next, Log Queue Lock is released (block 96). Note that log buffer Q has been removed from the queue and is ready to be written to disk. The actual length of the log buffer is determined, the buffer header is finalized with additional information, and the checksum value is calculated for buffer Q (block 97). Following this, F is set to reference the disk file for the log section numbered (Q modulo S) (block 98). This distributes the disk write operations in a round-robin fashion within the S section log files (see 18L, 18,M, 18N, . . . in FIG. 5). The process imposes a wait for disk write complete on buffer (Q–S) in section file F (block 99). This assures that the previous disk write in section F has completed. The asynchronous disk write of buffer Q at end of file F is initiated (block 100). An inquiry is made as to whether or not N is greater than LQX (diamond 101), and if so a return is made back to the step depicted by the block 86 for processing the next queued log buffer. On the other hand, if N is not greater than LQX then the process ends (bubble 102).

Figure 7D:
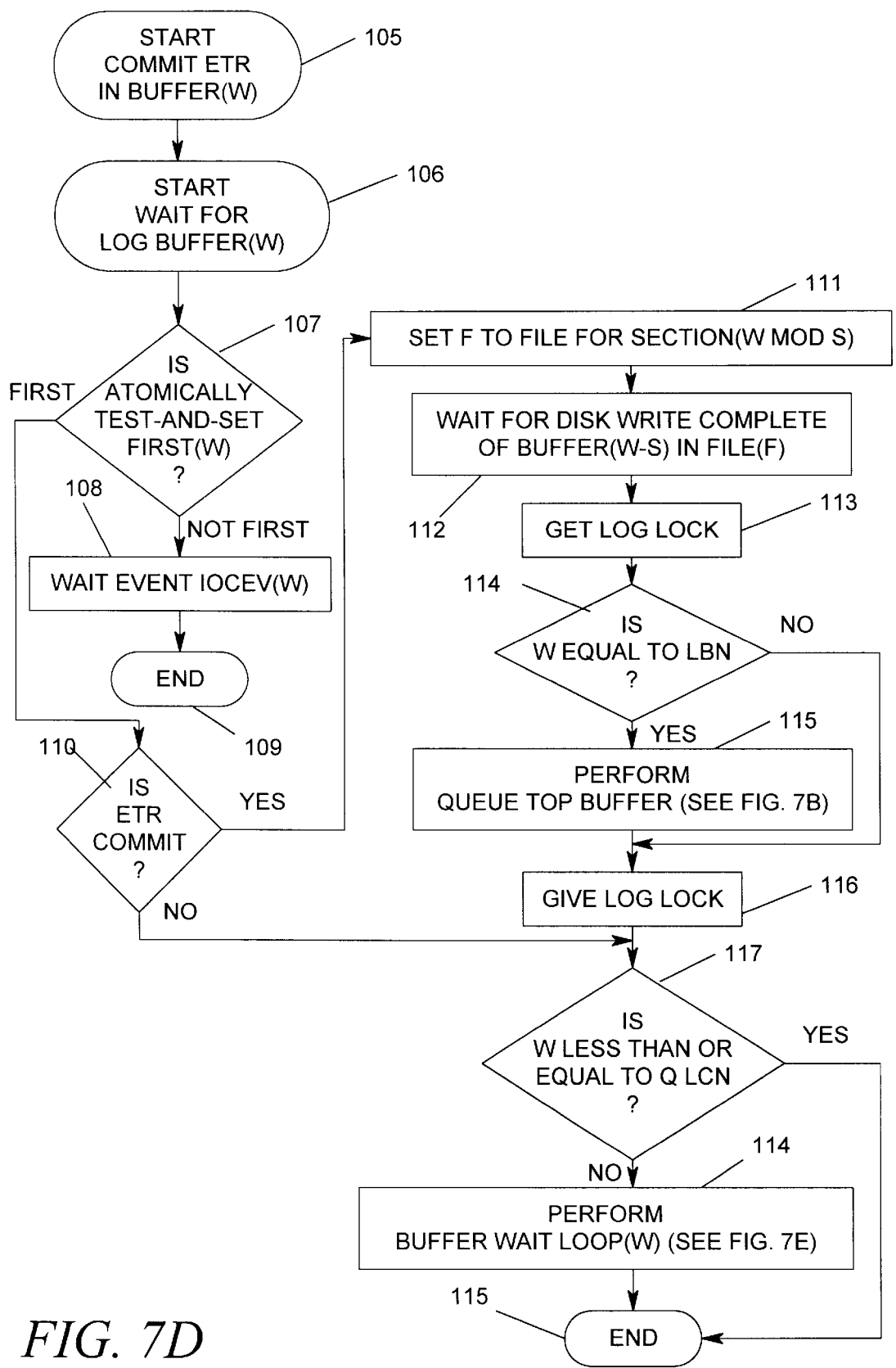

Referring now to FIG. 7D, the processes for committing the End of Transaction Record in buffer W and Wait for log buffer W are shown. The first process begins with a start bubble 105 followed by beginning the second process of waiting for log buffer W (bubble 106). Next, a test using an atomic test-and-set instruction the First switch for buffer W (diamond 107). The First task to test the switch causes future tasks to obtain a "Not First" result. If it is determined not to be the First, then a process wait is imposed for the I/O Complete Event IOCEV for buffer W (block 108) and the process ends (bubble 109).

If it is determined to be the first task for buffer W, then another test is made (diamond 110) to determine if entry was made at the Commit ETR in Buffer W start bubble 105. If the answer to this inquiry is yes, then F is set to file for section (W modulo S) (block 111). Next, a wait is imposed for the write to disk operation to complete buffer (W-S) in file F (block 112). Following this, a step of getting Log Lock is performed (block 113) and another inquiry is made as to whether or not W=LBN (diamond 114). If the answer to this inquiry is yes, then a queue TOP buffer process is performed (FIG. 7B, block 115). After this, the Log Lock is released (block 116).

Figure 7E:
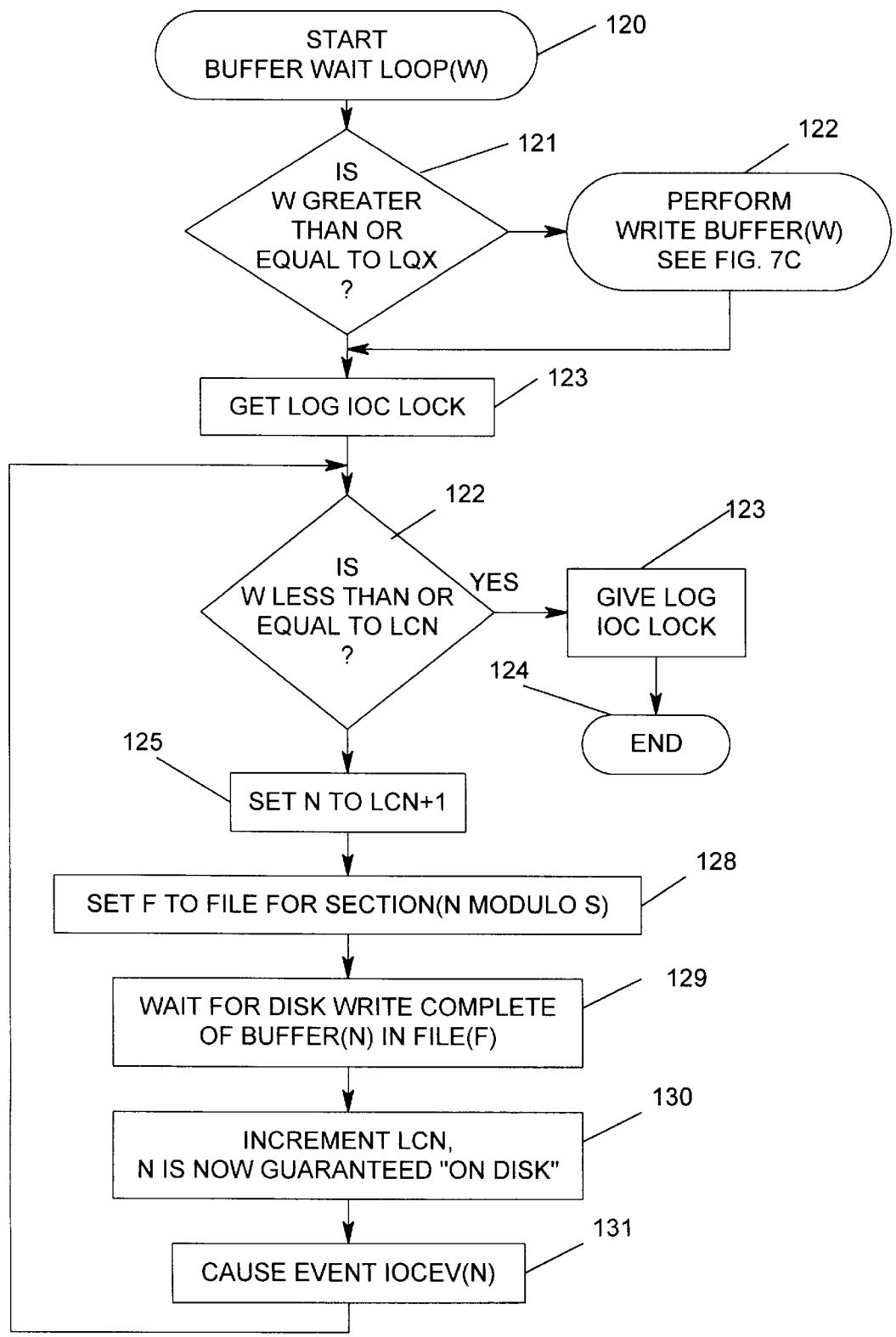

Upon completion of the step 116, or if the answer to the inquiry in the diamond 110 is no, yet another inquiry is made as to whether or not W i s less than or equal to LCN (diamond 117) . If the answer to this inquiry is no, then a wait buffer loop W process is performed (FIG. 7E, block 118). After this the process ends (bubble 119).

Referring now to FIG. 7E, the process for the buffer wait loop W is shown. The process begins with a start bubble 120 followed by an inquiry as to whether or not W is greater than or equal to LQX (diamond 121). If the answer to this inquiry is yes, then a write buffer W operation is performed (bubble 122), which is amplified in FIG. 7C. After this, or if W is not greater than or equal to LQX, a step of getting Log I/O Complete or Log IOC Lock is performed (block 123). Next, an inquiry is made as to whether or not W is less than or equal to LCN (diamond 124). If the answer to this inquiry is yes, then the Log IOC Lock is released (block 125) and the process ends (bubble 126).

On the other hand, if W is not less than or equal to LCN, then N is set equal to LCN plus one (block 127). Following this, F is set to file for section (N modulo S) (block 128). A wait is imposed on the process for the write to disk operation to complete buffer N in file F (block 129). After this, LCN is incremented since N is now guaranteed to be "On Disk" (block 130). Next, the I/O Complete Event IOCEV for buffer N is caused (block 131). This will allow all of the "Not First" tasks that may be waiting (at bubble 107, FIG. 7D) on buffer N to continue their operation. Finally, a return is made back to the diamond 124 for processing the next buffer, until log buffer W is marked as guaranteed.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a symmetric multi-processor computer system having a volatile memory and a persistent storage coupled thereto and a database management program operating in said computer system, said program including a method for reducing semaphore contention while waiting to transfer contents of log buffers to said persistent storage during asynchronous write operations using multiple insertion points, said method comprising the steps of:

a. clearing a switch and resetting an event indicating that no process tasks are waiting completion of a transfer of information in one of said log buffers to persistent storage;
   b. atomically testing and setting said switch to determine if a process task is the first task to attempt said waiting completion;
   c. if determined to be the first task, said first task assumes responsibility for guaranteeing that contents in said one of said log buffers are in persistent storage and causing said event; and,
   d. if determined not to be the first task, imposing a wait on said process until said event has been caused, whereby only said first task writes to persistent storage thereby improving processor cost of lock management and contention at the end of writing a log block to said persistent storage.

2. In a symmetric multi-processor computer system having a volatile memory and a persistent storage coupled thereto and a database management program operating in said computer system, said program including a method for reducing semaphore contention while waiting to serially transfer contents of log buffers to said persistent storage during asynchronous write operations using multiple insertion points, said method comprising the steps of:

a. queuing one of said log buffers for eventual delivery in a queue for storing in said persistent storage device;
   b. dequeuing said one of said log buffers from said queue in the preceding step;
   c. clearing a switch and resetting an event indicating that no process tasks are waiting completion of a transfer of information in said one of said log buffers to persistent storage;
   d. initiating transfer of contents of said log buffer to said persistent storage device;
   e. atomically testing and setting said switch to determine if this process task is the first task to attempt said waiting completion;
   f. if determined to be the first task, said first task assumes responsibility for guaranteeing that contents in said one of said log buffers are in persistent storage and causing said event; and,
   g. if determined not to be the first task, imposing a wait on said process until said event has been caused, whereby only said first task writes to persistent storage thereby improving processor cost of lock management and contention at the end of writing a log block to said persistent storage.

3. The method as in claim 2 wherein said step of queuing one of said log buffers further comprises the steps of:

h. determining whether or not the storage capacity for log buffers in said volatile memory has not been exceeded, and if yes; and,
   i. waiting for a first-in one of said log buffers to be written into said persistent storage device.

4. The method as in claim 2 wherein said step of dequeuing said of said log buffers further comprises the steps of:

h. getting an exclusive semaphore for protecting the serialization of extracting said log buffer;
   i. incrementing a counter indicating next buffer to be extracted; and
   j. releasing said exclusive semaphore.

5. The method as in claim 4 wherein said step of dequeing one of said log of buffers further comprises the steps of:

k. selecting a specific log buffer by repeating the steps of claim 4; and,
   l. initiating a transfer of each of said log buffers dequeued in the preceding step to said persistent storage device.

* * * * *